United States Patent

Kometani et al.

(10) Patent No.: US 6,847,150 B2
(45) Date of Patent: *Jan. 25, 2005

(54) ROTATING ELECTRICAL MACHINE FOR VEHICLE

(75) Inventors: Haruyuki Kometani, Tokyo (JP); Masaya Inoue, Tokyo (JP); Yoshihito Asao, Tokyo (JP); Masahiko Fujita, Tokyo (JP); Toshiyuki Yoshizawa, Tokyo (JP); Hiroyuki Akita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/698,387

(22) Filed: Nov. 3, 2003

(65) Prior Publication Data

US 2004/0140731 A1 Jul. 22, 2004

(30) Foreign Application Priority Data

Nov. 13, 2002 (JP) ........................................ 2002-329248

(51) Int. Cl.$^7$ ............................ H02K 1/24; H02K 19/22
(52) U.S. Cl. ........................................................ 310/263
(58) Field of Search ..................................... 310/263, 91

(56) References Cited

U.S. PATENT DOCUMENTS

| 6,404,096 | B1 | * | 6/2002 | Kometani et al. | .......... 310/263 |
| 6,531,803 | B2 | * | 3/2003 | Kometani et al. | .......... 310/263 |
| 6,555,944 | B1 | * | 4/2003 | York | ........................ 310/263 |

FOREIGN PATENT DOCUMENTS

JP          2001-218395 A        8/2001

* cited by examiner

Primary Examiner—Tran Nguyen
(74) Attorney, Agent, or Firm—Sughrue Mion, PLLC

(57) ABSTRACT

A rotating electrical machine for a vehicle includes a stator having a multi-phase armature winding, a rotor having a pair of field cores which rotate together with a rotating shaft, and a field winding for magnetizing the pair of field cores, the pair of field cores respectively includes magnetic poles extending in an axial direction of the rotating shaft and being arranged to alternately engage with each other through a predetermined clearance Dc, each of the magnetic poles having a width in a rotation direction thereof is formed in a stair shape to be smaller toward a tip of the width, and the clearance Dc between adjacent the magnetic poles is set within a range from 50° to 70° in electrical angle. As a result, the rotating electrical machine for a vehicle can be obtained in which exciting force of harmonic components is reduced, electromagnetic noise, torque ripple and the like are effectively suppressed, and the productivity is excellent.

14 Claims, 11 Drawing Sheets

10, 11   FIELD CORE 10a, 11a   MAGNETIC POLE

ROTATING ELECTRICAL MACHINE FOR VEHICLE

BACKGROUND OF THE INVENTION

1. Field of the Invention

The present invention relates to a rotating electrical machine for a vehicle including a field winding, and particularly to noise reduction of a generator or a generator motor.

2. Description of the Related Art

A magnetic field generated by a rotor magnetic pole of an AC generator or an AC generator motor mounted in a vehicle is not a complete sine wave, but has a waveform including higher harmonics. Besides, a magnetic field by a generating current flowing through an armature winding also includes higher harmonics, and by the interaction of both magnetic fluxes including the higher harmonics, magnetic sucking force is generated between a magnetic pole of a field core as a rotor and an armature core as a stator, and harmonic components of the sucking force generate electromagnetic oscillation, and generate noise, so-called electromagnetic noise. Besides, the harmonic components of the magnetic flux generate torque ripple when a generator motor is made to function as a motor, and generate output ripple when it is made to function as a generator, and degrades the characteristics.

In a conventional rotating electrical machine for a vehicle, as shown in FIG. 14 or FIG. 17 of JP-A-2001-218395, a magnetic pole of a rotor is shaped substantially into a trapezoid when viewed from a gap plane between the rotor and a stator, the opposite plane of the magnetic pole is also inclined so that its thickness becomes gradually thick from the tip to the root, and consideration is given so that harmonic components of the magnetic field generated by the rotor are lessened by using the effect of the skew. However, the manufacture of such a shape is not easy, and in order to simplify the shape, it is desirable that the inclined portion is eliminated as much as possible, and a linear shape parallel to a rotating shaft is formed.

In response to such a request, for example, a technique as described in JP-A-2001-218395 is disclosed. The technique disclosed in this document is such that a magnetic pole of a rotor is formed into a stair shape having plural parts in an axial direction, and the respective parts are set to have different widths in a rotation direction, so that pitches in the rotation direction between center lines of gaps of adjacent magnetic poles are changed stepwise in the axial direction, and the respective pitches in the rotation direction are set in a specified range.

In the magnetic pole formed into the stair shape as stated above, since there is a tendency that higher harmonics generated by the rotor become larger than those in the case of the substantially trapezoidal magnetic pole, it becomes necessary to reduce the higher harmonics. Thus, in the above document, it is assumed that the composition of the fifth and seventh harmonics generated by the rotor is the third harmonic, and the pitches in the rotation direction between the center lines of the gaps between the magnetic poles changing stepwise in the axial direction is set. However, the originally generated third harmonic can not be reduced by the measure relative to the composite value obtained on the assumption that the fifth and seventh harmonics have the wave height values of 1/n, and it is necessary to consider a direct reduction measure against the third harmonic having the highest wave height value.

Besides, in the magnetic pole formed into the stair shape, as compared with the conventional magnetic pole formed into substantially the trapezoid, since there is a tendency that the mass at the tip of the magnetic pole becomes large, the stress exerted on the root of the magnetic pole becomes large by the centrifugal force, and at the time of high speed rotation, the possibility that the mechanical reliability is damaged, for example, the magnetic pole part is deformed also becomes large.

SUMMARY OF THE INVENTION

The present invention has been made to solve the above described problem, and an object thereof is to provide a rotating electrical machine for a vehicle in which exciting force of harmonic components, which can be noise, is reduced, so that the occurrence of electromagnetic noise and output ripple (or torque ripple) is effectively suppressed, and productivity is excellent.

A rotating electrical machine for a vehicle according to the invention includes a stator including a multi-phase armature winding wound around an armature core, a rotor including a pair of field cores which are disposed at an inner diameter side of the armature core through a gap and rotate together with a rotating shaft, and a field winding for magnetizing the pair of field cores, wherein the pair of field cores respectively includes magnetic poles extending in an axial direction of the rotating shaft and being arranged to alternately engage with each other through a predetermined clearance Dc, each of the magnetic poles having a width in a rotation direction thereof is formed in a stair shape to be smaller toward a tip of the width, and the clearance Dc between adjacent the magnetic poles is set within a range from 50° to 70° in electrical angle.

As a result, the productivity is excellent, the third harmonic is effectively suppressed, and it becomes possible to reduce oscillation, noise, and output ripple (or torque ripple) caused by the third harmonic.

Besides, in the rotating electrical machine for a vehicle according to the invention, each of the magnetic poles has a multi-step structure in which the width of the magnetic pole in the rotation direction is narrow at the tip, and when respective widths of the magnetic pole are divided into a Da group and a Db group in electrical angle, the Da group and the Db group of the respective magnetic pole widths are set within a range of $(206-Dc)° \leq Da \leq (226-Dc)°$, $(134-Dc)° \leq Db \leq (154-Dc)°$.

As a result, the widths of the multi-step structure magnetic pole in the rotation direction are set to predetermined values, so that the fifth harmonic is also reduced, and the oscillation, noise, output ripple (or torque ripple) caused by these higher harmonics can be reduced.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
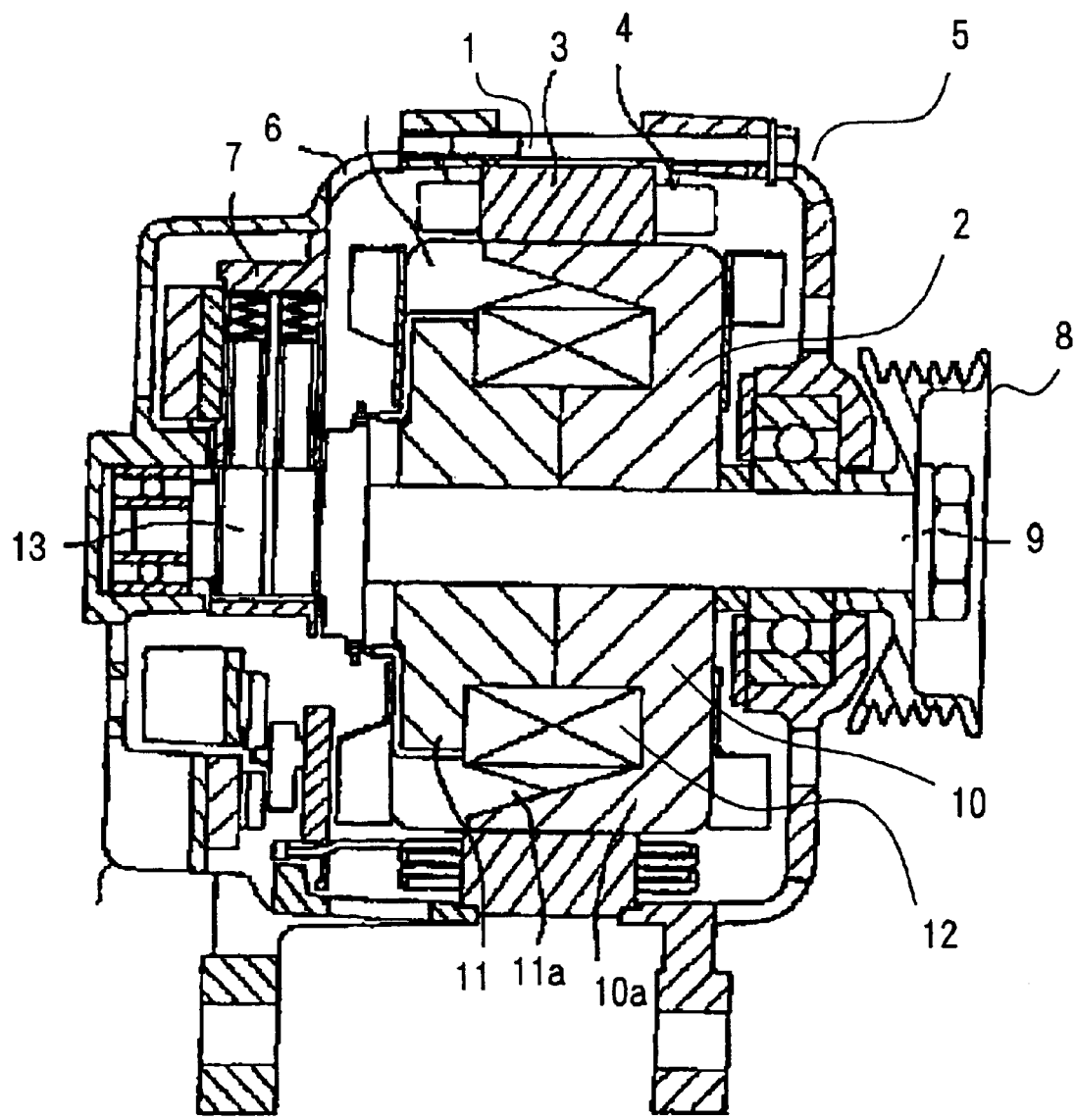
FIG. 1 is a whole structural sectional view of a rotating electrical machine for a vehicle according to embodiment 1 of the invention.
Figure 2:
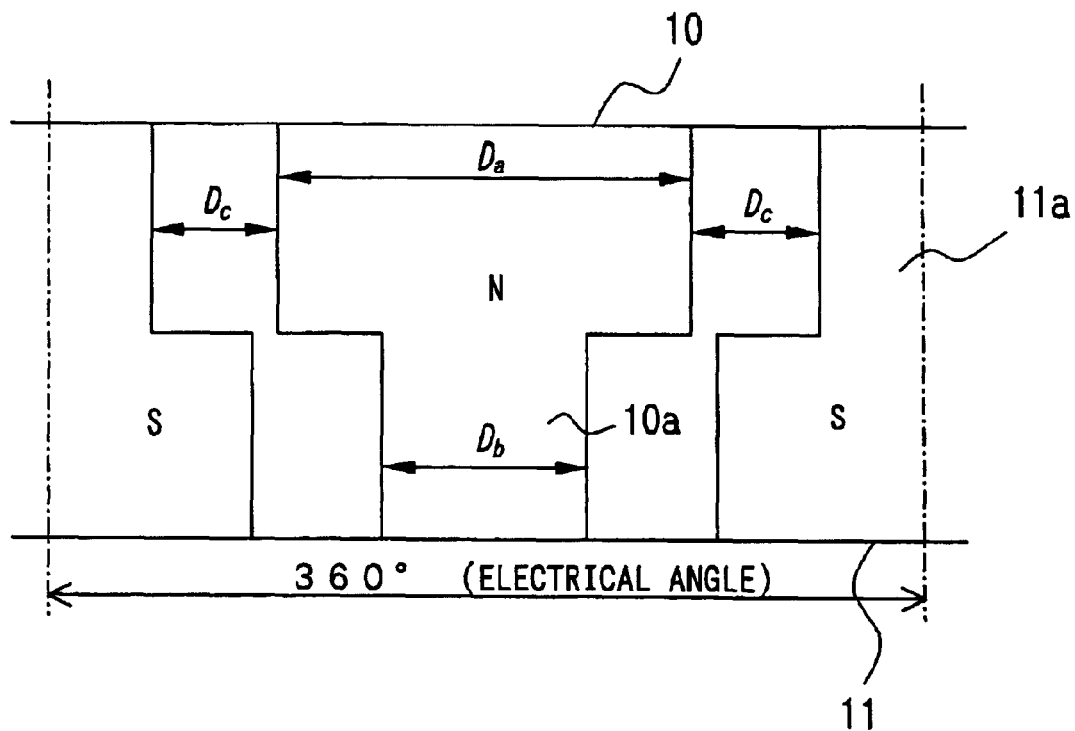
FIG. 2 is a developed view showing the shapes of magnetic poles of the rotating electrical machine for a vehicle according to the embodiment 1.
Figure 3:
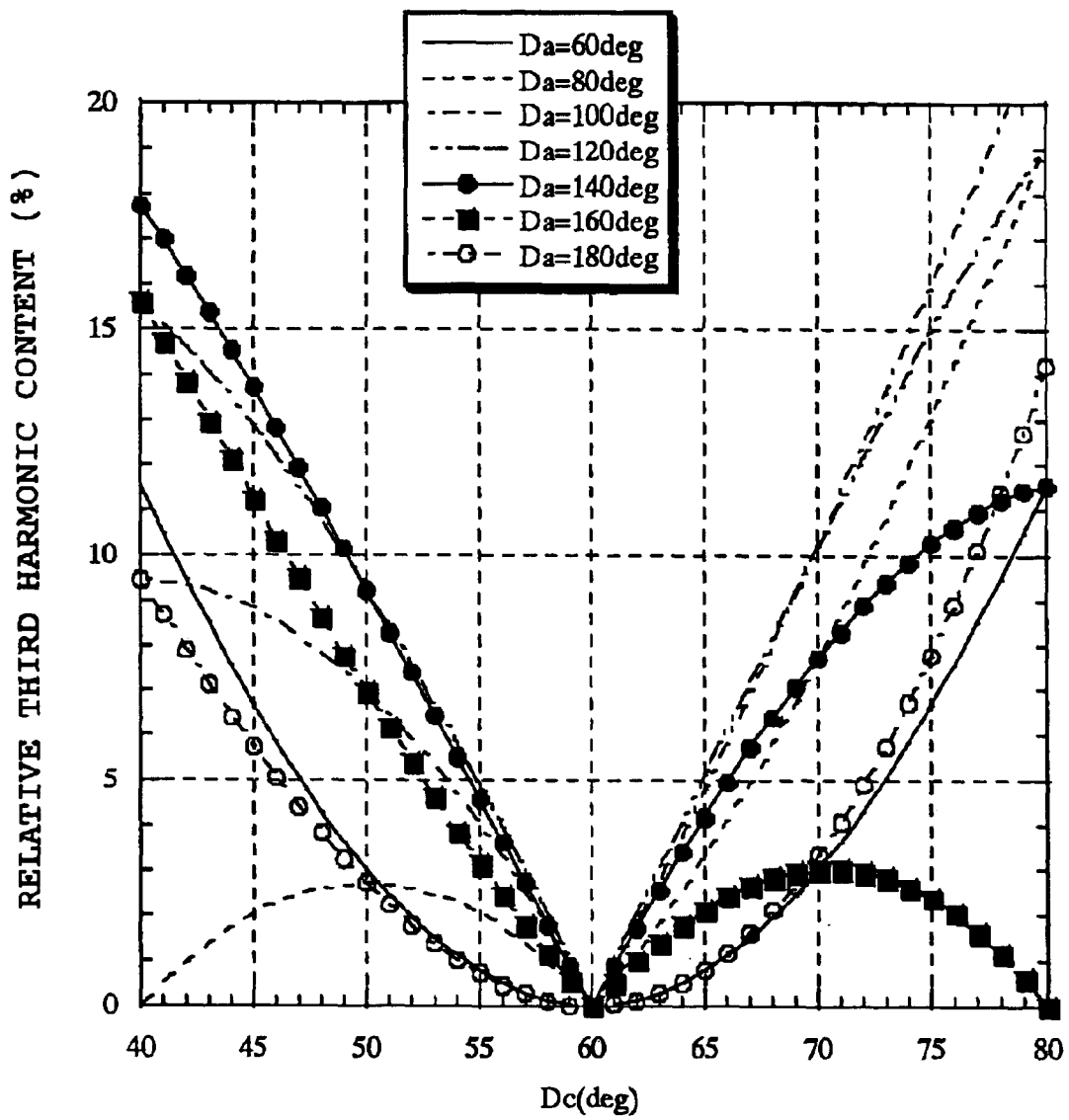
FIG. 3 is an explanatory view of the relative third harmonic content of the rotating electrical machine for a vehicle according to the embodiment 1.

FIGS. 1 to 3 are for explaining a rotating electrical machine for a vehicle according to embodiment 1 of the invention, and FIG. 1 is a whole structural sectional view of the rotating electrical machine for a vehicle. FIG. 2 is a developed view showing the shapes of magnetic poles of rotor cores and shows a case where each of the shapes of the magnetic poles has a two-step structure. FIG. 3 is a characteristic view showing the ratio of the third harmonic to the fundamental wave, that is, the relative third harmonic content, with respect to a clearance between magnetic poles.

In FIG. 1, the rotating electrical machine for a vehicle is constituted by a stator 1 and a rotor 2. The stator 1 is constituted by an armature core 3 having an armature winding 4, a front bracket 5 and a rear bracket 6 for holding the armature core 3 from both sides, a brush structure 7 for supplying a current to the rotor described later, and the like. The armature winding 4 is the winding corresponding to multi-phase alternate current. The rotor 2 is constituted by a rotating shaft 9 having a pulley 8, field cores 10 and 11 which are fixed to the rotating shaft 9 and in which pawl-shaped magnetic poles 10a and 11a extended in an axial direction of the rotating shaft 9 are arranged to engage with each other through a predetermined clearance, a field winding 12 wound to magnetize the field cores 10 and 11, and a slip ring 13 for supplying a field current to the field winding 12.

The pawl-shaped magnetic poles 10a and 11a provided to the field cores 10 and 11 are formed as shown in FIG. 2. The N pole magnetic pole and the S pole magnetic pole have the same shape and are disposed to engage with each other through a predetermined clearance Dc between magnetic poles, and in the magnetic pole of the two-step structure shown in FIG. 2, a magnetic pole width at a root side is Da, and a magnetic pole width at a tip side is Db. Accordingly, when expressed in electrical angle, Da+Db+2Dc=360°.

Among higher harmonics generated by the rotation of the rotor 2, the third space harmonic mainly includes three kinds of harmonics, that is, a magnetic saturation, a harmonic of clearance between magnetic poles of the rotor 2, and a magnetomotive force harmonic of the rotor 2, and these generates electromagnetic exciting force (oscillation, noise), torque ripple, power generation output ripple and the like by interaction with the magnetomotive force harmonic of the stator 1 and the slot harmonic of the armature core 3. This third space harmonic can be theoretically reduced by setting the clearance Dc between the magnetic poles to a value close to a predetermined value even if the magnet pole widths Da and Db are arbitrary values.

FIG. 3 is a characteristic view showing the ratio of the third space harmonic to the fundamental wave with respect to the clearance Dc (electrical angle) between the magnetic poles, and is expressed while the magnetic pole width Da (electrical angle) is made a parameter. As stated above, the relative third harmonic content takes various values with respect to the magnetic pole width Da, and it becomes a minimum value when the clearance Dc between the magnetic poles is 60° in electrical angle. In order to reduce the electromagnetic exciting force, it is desirable to suppress the relative third harmonic content to 10% or less, and this can be achieved when the value of the clearance Dc between the magnetic poles is set to $$50° \leq Dc \leq 70° \quad (1),$$

and by this, the third space harmonic is suppressed, and the oscillation, noise, torque ripple, and power generation output ripple can be reduced.

Embodiment 2

Figure 4:
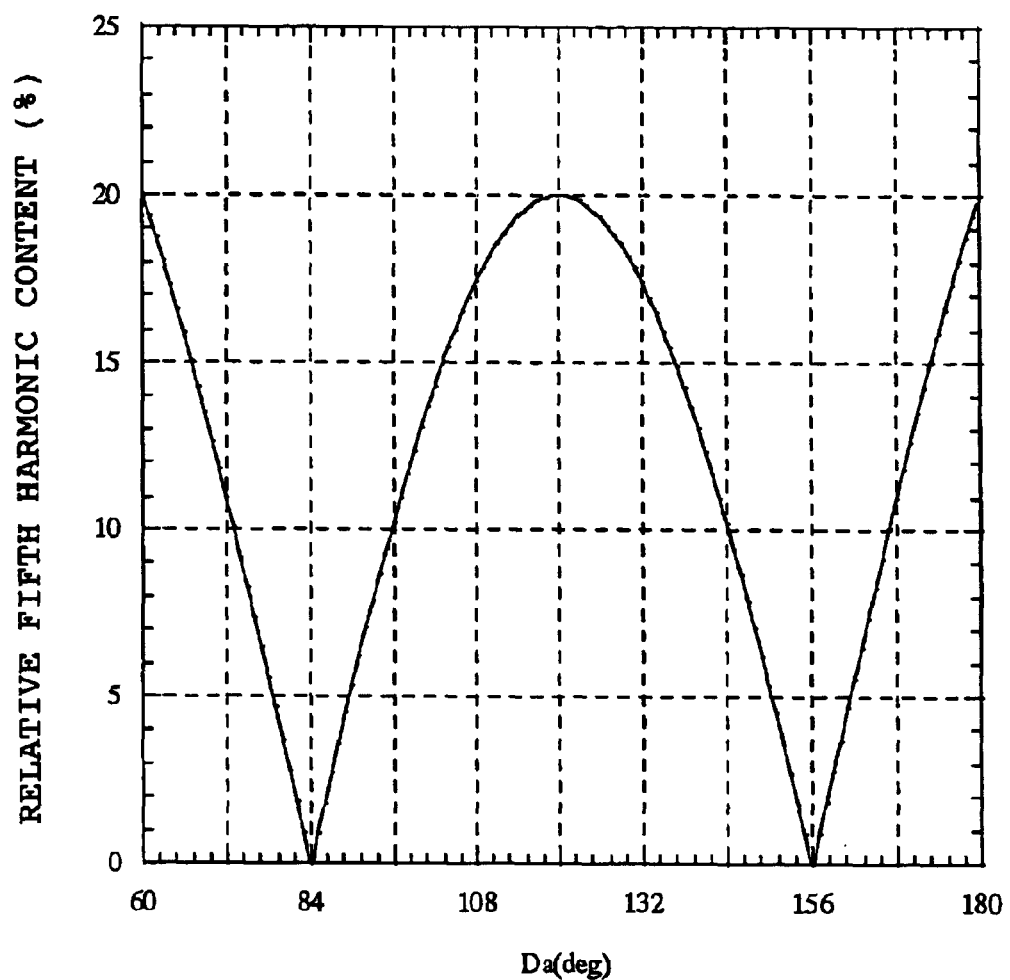
FIG. 4 is an explanatory view of the relative fifth harmonic content of a rotating electrical machine for a vehicle according to embodiment 2.

FIG. 4 is a characteristic view showing the relative fifth space harmonic content with respect to the magnetic pole width Da (electrical angle) or Db, and in this embodiment, an attempt is made to reduce the fifth space harmonic. The fifth space harmonic of the rotor 2, next to the third space harmonic, influences the electromagnetic exciting force and the torque ripple by the interaction with the slot harmonic of the armature core 3, and is required to be reduced together with the third space harmonic.

In the two-step structure magnetic pole as shown in FIG. 2 in the embodiment 1, the relative fifth space harmonic content is changed by the magnetic pole widths of the magnetic poles 10a and 11a as shown in FIG. 4. With respect to the magnetic pole widths Da and Db in FIG. 2, the magnetic pole width for reducing the fifth space harmonic is expressed by $$(206°-Dc) \leq Da \leq (226°-Dc) \quad (2)$$

$$(134°-Dc) \leq Db \leq (154°-Dc) \quad (3),$$

and in the case where the clearance Dc between the magnetic poles is 60° in electrical angle, it is appropriate that the magnetic pole width Da is set within a range of 146° to 166° in electrical angle, and the magnetic pole width Db is set within a range of 74° to 94° in electrical angle.

From the characteristic of FIG. 4, when the widths of the magnetic pole widths Da and Db are made to fall within the above ranges, the content of the fifth space harmonic to the fundamental wave can be made 10% or less. That is, in combination with the result of the embodiment 1, when the value of the clearance Dc between the magnetic poles is made about 60° in electrical angle, and the values of the magnetic pole width Da and the magnetic pole width Db are made to fall within the ranges of the expression (2) and the expression (3), the third space harmonic and the fifth space harmonic are suppressed, and the oscillation, noise, torque ripple, and power generation output ripple can be reduced.

Embodiment 3

Figure 5:
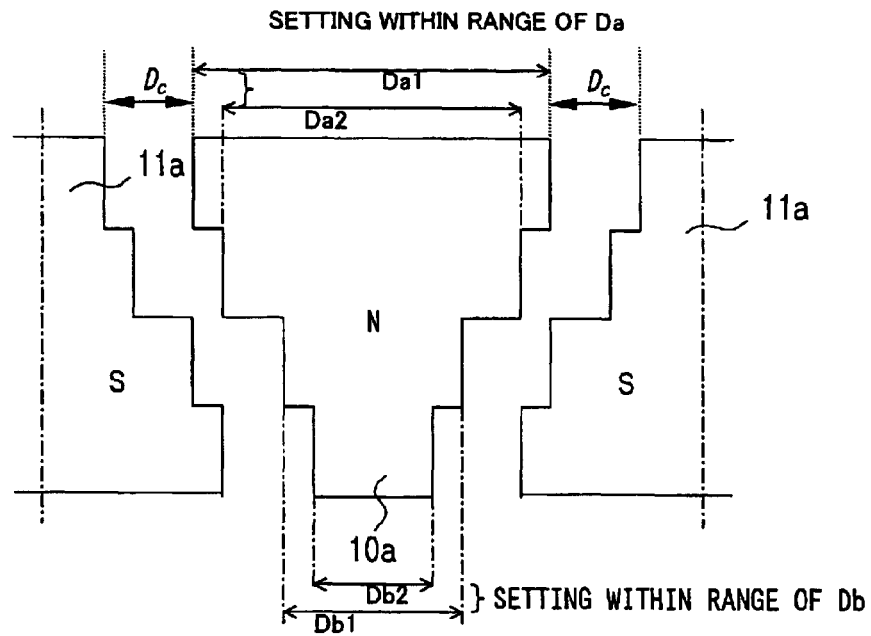
FIG. 5 is a developed view showing the shape of magnetic poles of a rotating electrical machine for a vehicle according to embodiment 3.

FIG. 5 is a developed view of a magnetic pole used for a rotating electrical machine for a vehicle according to embodiment 3 of the invention, and in this embodiment, as shown in the drawing, the shape of the magnetic pole is made to have a multi-step structure. In the two-step structure of FIG. 2 described in the embodiment 1, in order to make the clearance Dc between the magnetic poles constant over the whole length of the magnetic pole, the step part of the N pole and the step part of the S pole have the same position in the axial direction, and accordingly, unless the respective values of Da and Db described in the embodiment 2 are set to values close to minimum values in the ranges of the expression (2) and the expression (3), a distance between adjacent magnetic poles at the step parts becomes small, and a leak magnetic flux between the magnetic poles is increased. The increase of the leak magnetic flux results in the lowering of the performance in the case where the function as the generator or the motor is used.

Thus, in this embodiment, the shape of the magnetic pole is made to have the multi-step structure, the magnetic pole width D of each of the magnetic poles $10a$ and $11a$ is stepwise narrowed from the root side, and is set to a value within the range of the magnetic pole width Da or Db explained in the embodiment 2. For example, in the case of the four-step structure, two steps at the root side are set to values within the range of Da, and two steps at the tip side are set to values within the range of Db, and the four-step structure is formed. When the respective magnetic pole widths are made Da1, Da2, Db1 and Db2, the widths Da1, Da2, Db1 and Db2 are made $$(206°-Dc) \leq Da1, Da2 \leq (226°-Dc) \quad (4)$$

$$(134°-Dc) \leq Db1, Db2 \leq (154°-Dc) \quad (5),$$

and the respective magnetic pole widths are set to values within the ranges of the expressions (4) and (5). Then, the clearance Dc between the magnetic poles is made 60°±10° in electrical angle.

By make a setting in this way, similarly to the case of the embodiment 2, the third space harmonic and the fifth space harmonic are suppressed, and the oscillation, noise, torque ripple and power generation output ripple can be reduced, and further, the leak magnetic flux between the magnetic poles is reduced, the performance as the generator or the motor can be kept or improved, and the efficient rotating electrical machine can be formed.

Embodiment 4

Figure 6:
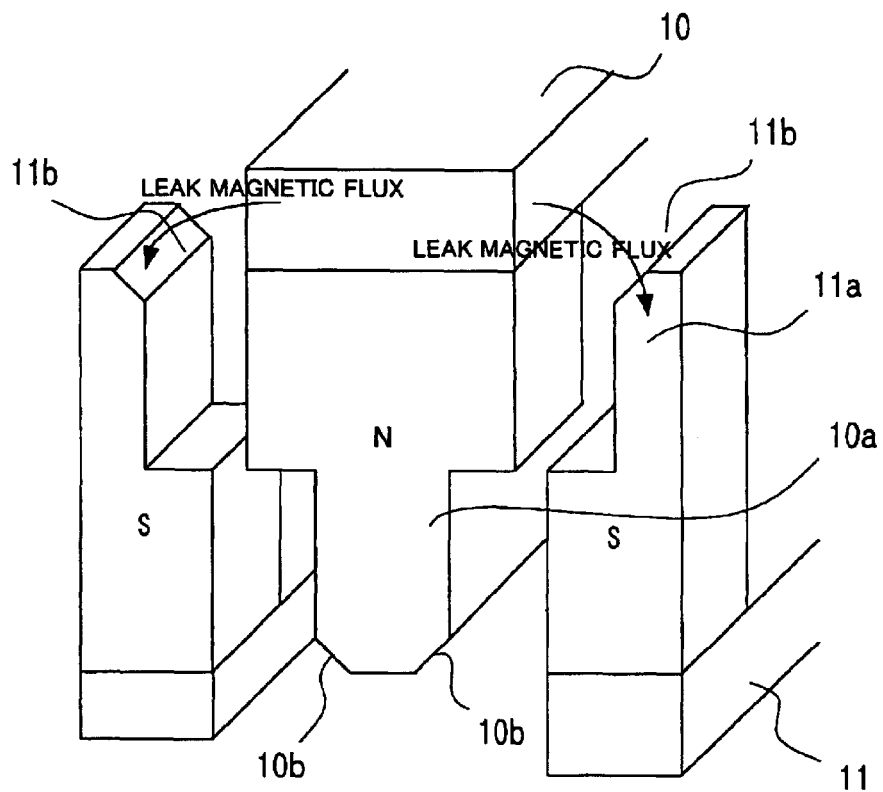
FIG. 6 is an explanatory view of the shape of magnetic poles of rotor cores of a rotating electrical machine for a vehicle according to embodiment 4.
Figure 7:
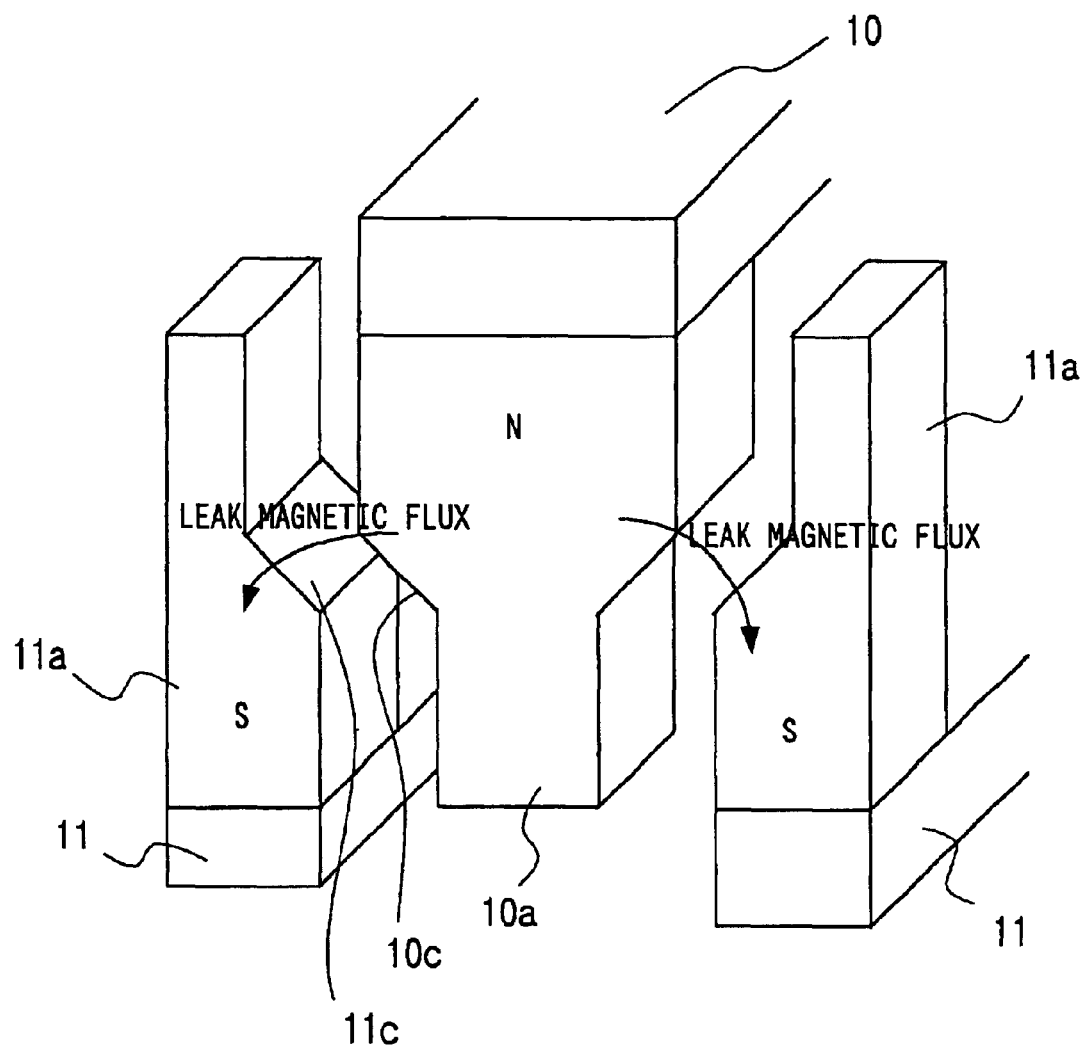
FIG. 7 is an explanatory view of the shape of the magnetic poles of the rotor cores of the rotating electrical machine for a vehicle according to the embodiment 4.

FIGS. 6 and 7 show a magnetic pole shape of a rotor core in embodiment 4 of the invention, and this embodiment relates to the magnetic pole shape for reducing the leak magnetic flux similarly to the embodiment 3. In FIG. 6, chamfer-shaped cutout parts $10b$ and $11b$ are provided at corner parts of tip parts of the magnetic poles $10a$ and $11a$. Since the tip part of the magnetic pole approaches a not-shown disk part of an opposite magnetic pole, by cutting out the corner part into the chamfer shape as stated above, the leak magnetic flux can be reduced and the performance of the rotating electrical machine can be improved. Besides, although not shown, by similarly cutting out corners of steps, where the magnetic pole width is changed, into the chamfer shape, the leak magnetic flux can be reduced similarly to the embodiment 3. Incidentally, as the magnetic pole shape except for the tip part and the step part, one explained in the embodiments 1 to 3 is used.

In FIG. 7, in order to reduce the leak magnetic flux at a step part, inclined parts $10c$ and $11c$ in which magnetic pole widths are changed in an axial direction of a rotating shaft are provided at step parts. By forming the parts as stated above, a distance from an adjacent opposite magnetic pole at the step part becomes sufficiently large, the leak magnetic flux is reduced and the performance of the rotating electrical machine can be improved. Incidentally, when the distance between the inclined parts $10c$ and $11c$ in the rotation direction is made the value of Dc, with respect to the reduction of the third space harmonic, the same effect as the embodiment 1 can be obtained, and although the magnetic pole widths Da and Db are out of the range of the embodiment 2 at a portion of the inclined parts $10c$ and $11c$, it is slight with respect to the whole lengths of the magnetic poles $10a$ and $11a$, and the effect to reduce the fifth space harmonic can also be sufficiently secured.

Embodiment 5

Figure 8:
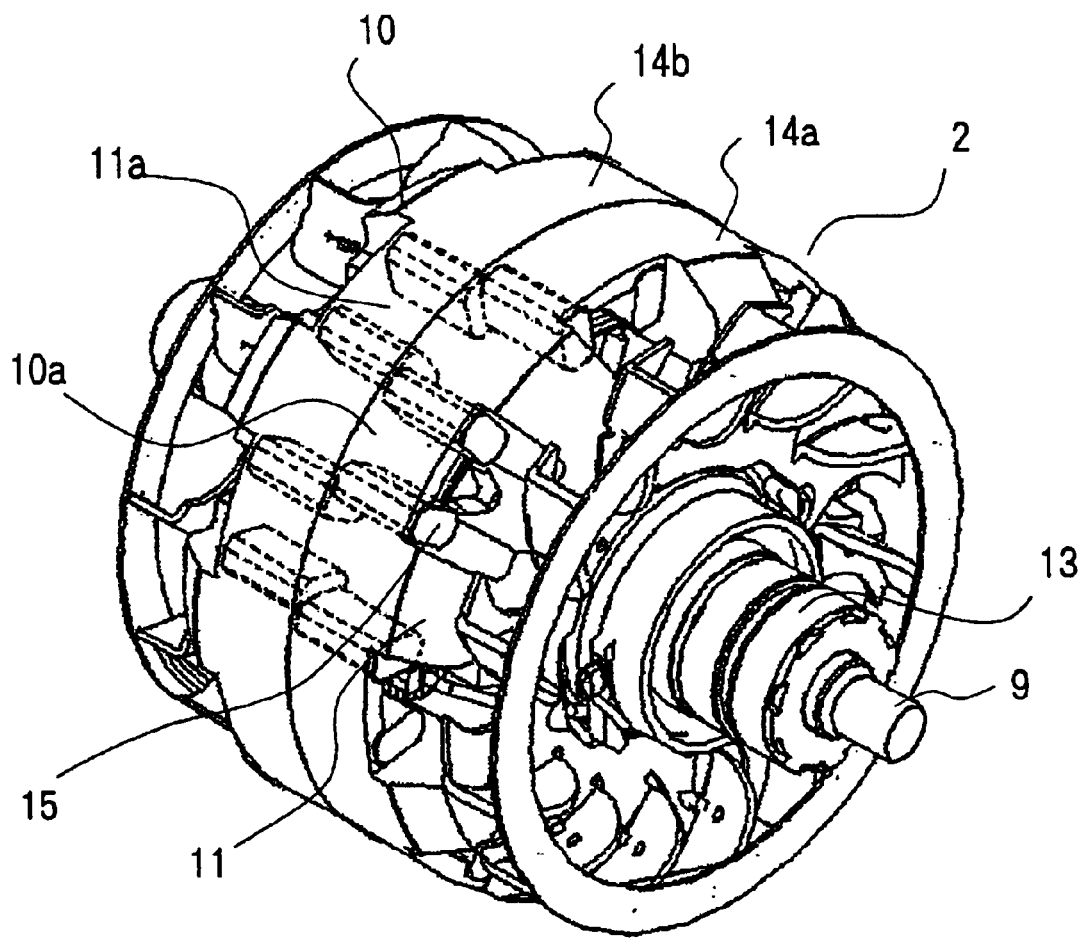
FIG. 8 is a perspective view showing a structure of a rotor of a rotating electrical machine for a vehicle according to embodiment 5.

FIG. 8 is a perspective view showing a structure of a rotor of a rotating electrical machine for a vehicle according to embodiment 5 of the invention. The rotor of this embodiment is for preventing an increase in stress by the centrifugal force resulting from an increase in mass of a magnetic pole tip part formed into a stair shape. In FIG. 8, similarly to the case of FIG. 1 explained in the embodiment 1, a rotating shaft 9 of a rotor 2 is provided with field cores 10 and 11, a field winding not shown in FIG. 8 is wound around the field cores 10 and 11, and a slip ring 13 is provided to supply a field current to the field winding.

Pawl-shaped magnetic poles $10a$ and $11a$ as explained in the embodiment 1 or the embodiment 4 are provided to the field cores 10 and 11, a ring-shaped coupling member $14a$ is fitted to at least tip part outer peripheries of the magnetic poles $10a$, and a coupling member $14b$ is fitted to tip sides of the magnetic poles $11a$. A clearance Dc between magnetic poles to reduce the third space harmonic is provided between the magnetic pole $10a$ and the magnetic pole $11a$ formed into the two-step structure or multi-step structure, and a permanent magnet 15 having approximately a thickness of Dc in a magnetization direction is provided in the clearance between the magnetic poles as shown in FIG. 8.

With respect to the coupling members $14a$ and $14b$, for example, thin nonmagnetic steel rings may be fixed by press fit or the like to the outer peripheries of the magnetic poles $10a$ and $11a$, or thin magnetic rings may be fixed by press fit. Besides, a method may be adopted in which adjacent magnetic poles are mechanically coupled. In the case where the magnetic poles $10a$ and $11a$ are constructed into linear shape parallel to the rotating shaft 9, the mass of the tip part is increased and the stress due to the centrifugal force is increased. However, by the construction like this, the coupling members $14a$ and $14b$ bear part of the stress, mechanical troubles such as deformation of the magnetic pole at the time of high speed rotation can be prevented, and the rotor having high reliability can be obtained.

Besides, in the case where the permanent magnet 15 is provided in the clearance between the magnetic poles, even in the case where a magnetic substance is used for the coupling members $14a$ and $14b$, the leak magnetic flux increased by the coupling members $14a$ and $14b$ can be compensated, and when the magnetic flux by the permanent magnet 15 is selected to a value or more at which the coupling members 14a and 14b can be saturated, it also becomes possible to improve the performance of the rotating electrical machine for a vehicle. Incidentally, the permanent magnet 15 is magnetized to have the same polarity as the adjoining magnetic pole.

Embodiment 6

Figure 9:
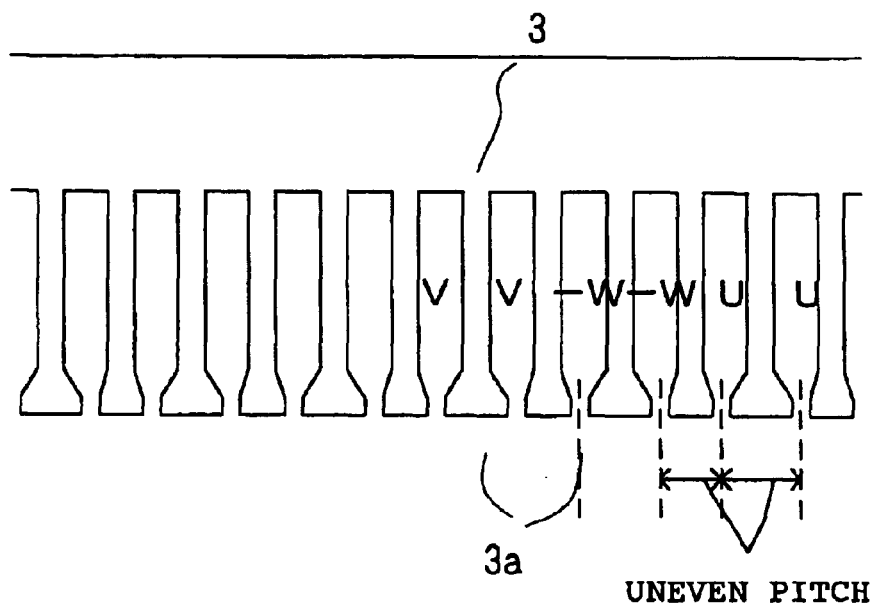
FIG. 9 is a developed view of an armature core of a rotating electrical machine for a vehicle according to embodiment 6.
Figure 10:
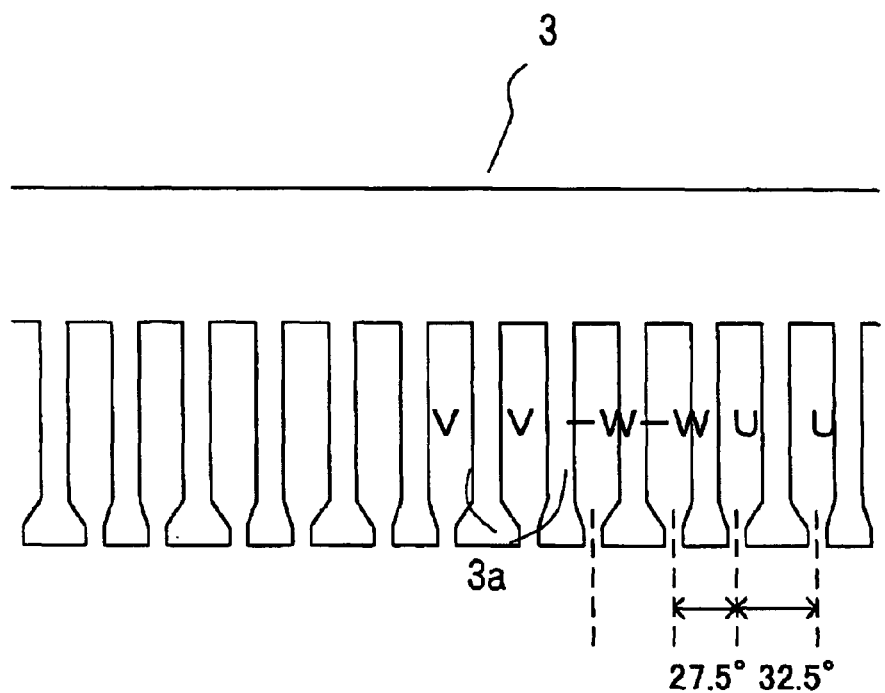
FIG. 10 is a developed view of the armature core of the rotating electrical machine for a vehicle according to the embodiment 6.

FIGS. 9 and 10 are developed views of an armature core 3 for explaining a rotating electrical machine for a vehicle according to embodiment 6 of the invention. In the embodiments 1 and 2, it has been described that the higher harmonics of the rotor 2 influence the electromagnetic exciting force, the torque ripple and the like by the interaction with the slot harmonic of the armature core 3, and it becomes possible to reduce the electromagnetic exciting force and the torque ripple by also reducing the slot harmonic of the armature core 3.

For that purpose, in FIG. 9, the widths of portions of teeth 3a of the armature core 3 opposite to the rotor 2 are made, as an example, alternately different for every slot, and open pitches of the slots are made uneven pitches. By the construction as stated above, together with the reduction effect of the higher harmonics of the rotor 2, the electromagnetic exciting force and the torque ripple can be effectively reduced. Besides, FIG. 10 shows an example in which in the stator in which the number of slots for each polarity and each phase is two, the widths of portions of the teeth 3a opposite to the rotor 2 are changed, so that the open pitches of the slots are made uneven pitches of 27.5° and 32.5°. By this structure, the fifth space harmonic at the side of the stator 1 can be reduced, the interaction with the fifth space harmonic of the rotor 2 is reduced, and the electromagnetic exciting force can be lowered. Incidentally, windings having the same phase are wound around the slots separated by the open pitch of 32.5°, windings having different phases are wound around the slots separated by the open pitch of 27.5°, and the armature windings of the respective phases are zigzag connected.

Embodiment 7

In the case where the fifth space harmonic of the stator 1 is reduced by the embodiment 6 and the interaction with the fifth space harmonic of the rotor 2 is reduced, since the influence by the fifth space harmonic is lessened, at the side of the rotor 2, the total electromagnetic exciting force can be reduced by reducing the seventh space harmonic. In the magnetic pole of the two-step structure in FIG. 2 explained in the embodiment 1, the magnetic pole width to reduce the seventh space harmonic is expressed by $$(195.7°-Dc) \leq Da \leq (215.7°-Dc) \quad (6)$$

$$(144.3°-Dc) \leq Db \leq (164.3°-Dc) \quad (7).$$

In the case where the clearance Dc between the magnetic poles is 60° in electrical angle, the magnetic pole width Da is a value between 135.7° to 155.7° in electrical angle, and the magnetic pole width Db is a value between 84.3° and 104.3° in electrical angle. As stated above, the magnetic pole widths are selected, and the slot pitches of the armature core 3 are selected on the basis of the embodiment 6, so that the third space harmonic to the seventh space harmonic are effectively reduced, and the rotating electrical machine for a vehicle which has low electromagnetic exciting force can be obtained.

Besides, as explained in the embodiment 3, in the above structure, in order to reduce the leak magnetic flux between adjacent magnetic poles at a step part, similarly to the embodiment 3, the magnetic pole is made to have a multi-step structure, and the respective magnetic pole widths have only to be set to values within the Da range and the Db range in electrical angle. That is, when the respective magnetic pole widths are divided into a Da group and a Db group, the Da group and the Db group of the magnetic pole widths are made $$(195.7°-Dc) \leq Da \leq (215.7°-Dc) \quad (8)$$

$$(144.3°-Dc) \leq Db \leq (164.3°-Dc) \quad (9),$$

and the respective magnetic pole widths are set to values within the ranges of the expressions (8) and (9), so that the leak magnetic flux between the magnetic poles is suppressed while the oscillation, noise, torque ripple and the like are reduced, and the efficient rotating electrical machine can be formed.

Embodiment 8

Figure 11:
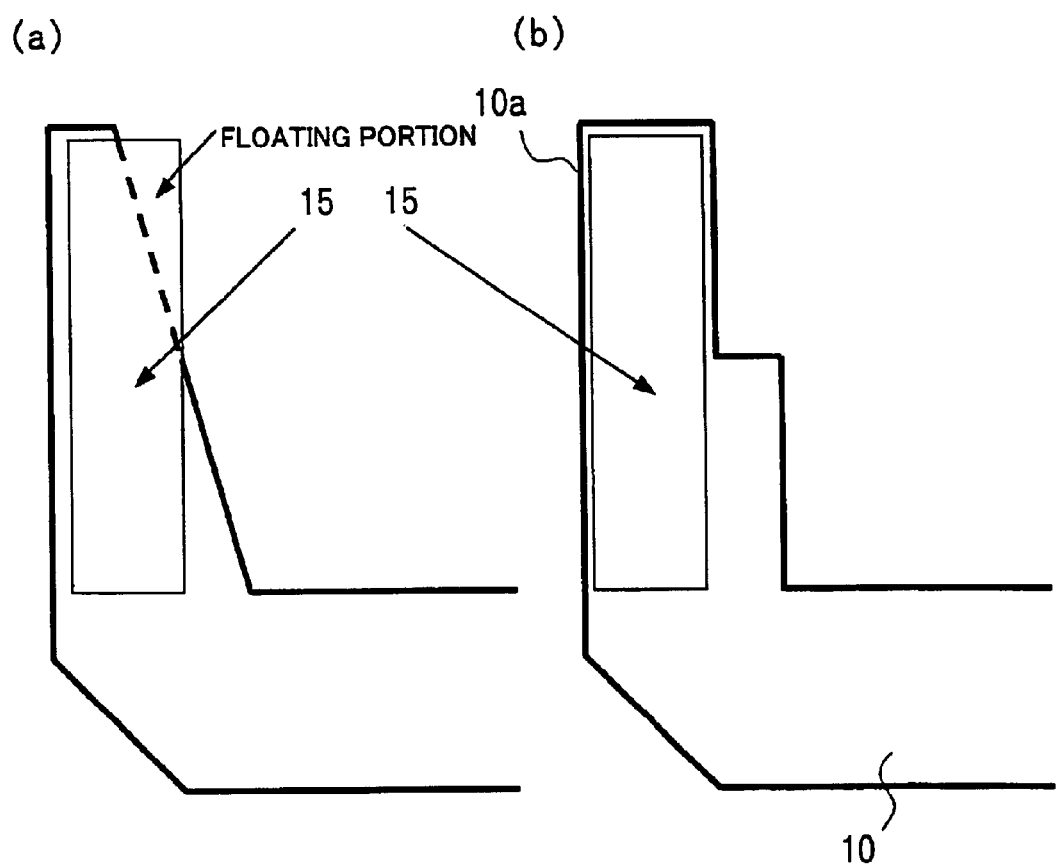
FIGS. 11A and 11B are structural views of rotors for explaining a rotating electrical machine for a vehicle according to embodiment 8.
Figure 12:
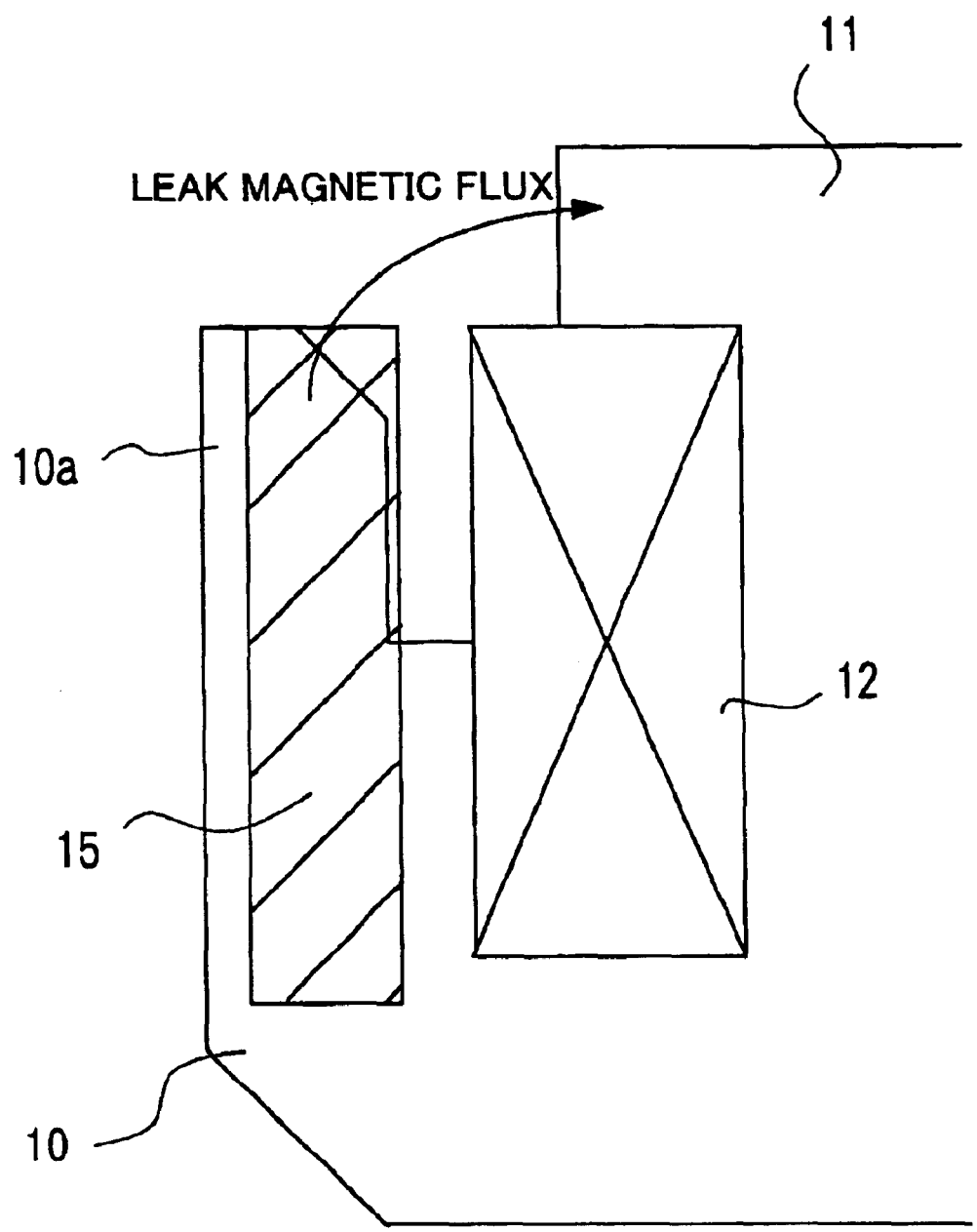
FIG. 12 is a structural view of a rotor for explaining the rotating electrical machine for a vehicle according to the embodiment 8.
Figure 13:
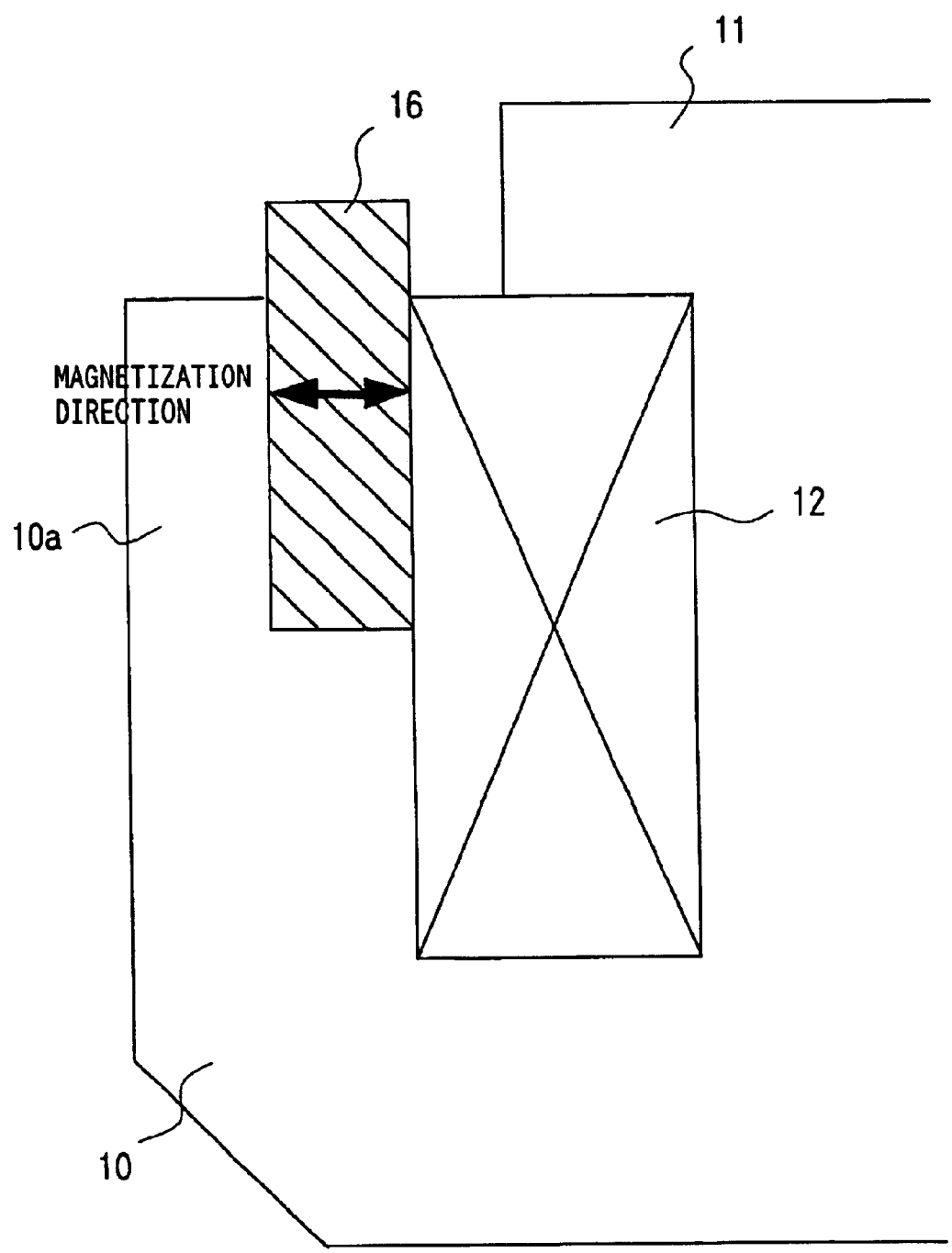
FIG. 13 is a structural view of the rotor for explaining the rotating electrical machine for a vehicle according to the embodiment 8.

FIGS. 11 to 13 are structural views of a rotor for explaining a rotating electrical machine for a vehicle according to embodiment 8 of the invention, and in FIGS. 11A and 11B, the thicknesses of magnetic poles 10a and 11a in the radius direction are changed stepwise. As described above, the conventional magnetic pole is formed such that its section linearly becomes thin toward the tip as shown in FIG. 11A. Thus, although it is advantageous for dealing with the centrifugal force at the time of high speed rotation, in the case where the permanent magnet 15 for suppressing the leak magnetic flux explained in the embodiment 5 is provided, when the permanent magnet 15 is made to have a rectangular shape excellent in productivity, as shown in FIG. 11A, the permanent magnet 15 projects from the side of the magnetic pole, and all the area of the permanent magnet 15 can not be effectively used.

In the two-step structure or multi-step structure magnetic pole as the feature of the invention, in order to facilitate the production, although the magnetic pole has basically the linear shape parallel to the rotating shaft, as shown in FIG. 11B, for example, in the case of the two-step structure magnetic pole, it is easy to expand the inner diameter at the tip side by linearly changing the thickness of the magnetic pole at the step part or in the vicinity thereof. By the formation as stated above, even if the permanent magnet 15 is rectangular, the leak magnetic flux can be suppressed by using all the area effectively, and irrespective of the existence of the permanent magnet 15, the structure is also advantageous for dealing with the centrifugal force at the time of high speed rotation.

Besides, as shown in FIG. 12, by cutting out the corner parts of the magnetic poles 10a and 11a of the two-step structure (multi-step structure) at the tip part of the inner diameter side so as to form chamfer shapes, it is possible to suppress the leak magnetic flux from, for example, the tip part of the magnetic pole 10a to the disk part of the field core 11 as the field magnetic pole, and the performance of the rotating electrical machine can be improved. Further, as shown in FIG. 13, by making the permanent magnet 16 intervene between the magnetic poles 10a and 11a of the two-step structure at the tip side of the inner diameter, the leak magnetic flux from, for example, the tip part of the magnetic pole 10a to the disk part of the field core 11 can be almost eliminated, and the performance of the rotating electrical machine can be improved. Incidentally, the permanent magnet 16 is magnetized to have the same polarity as the magnetic pole with which its adjoining part to a magnetic pole is in contact.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A rotating electrical machine for a vehicle, comprising:
   a stator including a multi-phase armature winding wound around an armature core;
   a rotor including a pair of field cores which are disposed at an inner diameter side of the armature core through a gap and rotate together with a rotating shaft; and
   a field winding for magnetizing the pair of field cores,
   wherein the pair of field cores respectively includes a plurality of magnetic poles extending in an axial direction of the rotating shaft and being arranged to alternately engage with each other through a predetermined clearance Dc,
   each of the plurality of magnetic poles having a width in a rotational direction thereof which is formed in a stair shape and smaller toward a tip thereof, and
   the clearance Dc between adjacent magnetic poles is set within a range from 50° to 70° in electrical angle.

2. A rotating electrical machine for a vehicle according to claim 1, wherein the width of each of the stair-shaped magnetic poles in the rotational direction has a two-step structure in which the width at the tip is narrow, and when the magnetic pole width at a wide portion is Da in electrical angle and the magnetic pole width at the narrow tip is Db in electrical angle, the magnetic pole width Da and the magnetic pole width Db are set within ranges of $$(206-Dc)° \leq Da \leq (226-Dc)° \text{ and}$$

$$(134-Dc)° \leq Db \leq (154-Dc)°.$$

3. A rotating electrical machine for a vehicle according to claim 1, wherein the width of each of the stair-shaped magnetic poles in the rotational direction has a multi-step structure in which the width at the tip is narrow, and when respective widths of the magnetic pole are divided into a wide Da group and a narrow Db group in electrical angle, the Da group and the Db group of the respective magnetic pole widths are set within ranges of $$(206-Dc)° \leq Da \leq (226-Dc)° \text{ and}$$

$$(134-Dc)° \leq Db \leq (154-Dc)°.$$

4. A rotating electrical machine for a vehicle according to claim 1, wherein at least one of (1) corners of step parts and (2) corners of tip parts of the stair-shaped magnetic poles are cut off to form chamfer shapes.

5. A rotating electrical machine for a vehicle according to claim 1, further comprising inclined parts, whose magnetic pole widths are changed in the axial direction of the rotating shaft, between respective parts of the stair-shaped magnetic poles where the magnetic pole widths are different from each other.

6. A rotating electrical machine for a vehicle according to claim 1, wherein a magnetized permanent magnet is interposed between adjacent magnetic poles, and ring-shaped coupling members are fitted to at least tip part outer peripheries of the magnetic poles.

7. A rotating electrical machine for a vehicle according to claim 6, wherein the coupling members are saturated by a magnetic flux of the permanent magnet.

8. A rotating electrical machine for a vehicle according to claim 1, wherein the armature core includes slots around which the armature winding is wound, the number of slots is two for each polarity and each phase, and open pitches between the respective slots are uneven pitches.

9. A rotating electrical machine for a vehicle according to claim 8, wherein the open pitch between the slots in which adjacent windings having a same phase are inserted is 32.5° in electrical angle, and the open pitch between the slots in which adjacent windings having different phases are inserted is 27.5° in electrical angle.

10. A rotating electrical machine for a vehicle according to claim 8, wherein the width of each of the stair-shaped magnetic poles in the rotational direction has a two-step structure in which the width at the tip is narrow, and when the magnetic pole width at a wide portion is Da in electrical angle and the magnetic pole width at the narrow tip is Db in electrical angle, the magnetic pole width Da and the magnetic pole width Db are set within ranges of $$(195.7-Dc)° \leq Da \leq (215.7-Dc)° \text{ and}$$

$$(144.3-Dc)° \leq Db \leq (164.3-Dc)°.$$

11. A rotating electrical machine for a vehicle according to claim 8, wherein the width of each of the stair-shaped magnetic poles in the rotational direction has a multi-step structure in which the width at the tip is narrow, and when respective widths of the magnetic pole are divided into a wide Da group and a narrow Db group in electrical angle, the Da group and the Db group of the respective magnetic pole widths are set within ranges of $$(195.7-Dc)° \leq Da \leq (215.7-Dc)° \text{ and}$$

$$(144.3-Dc)° \leq Db \leq (164.3-Dc)°.$$

12. A rotating electrical machine for a vehicle according to claim 1, wherein a step part is formed at an inner diameter portion of the stair-shaped magnetic pole and at an almost identical position to a step part of the stair shape, and a rectangularly shaped permanent magnet is provided on a side surface of the inner diameter portion step part.

13. A rotating electrical machine for a vehicle according to claim 12, wherein corner parts of the magnetic poles at the tip part inner diameter portion are cut out to form chamfer shapes.

14. A rotating electrical machine for a vehicle according to claim 1, wherein a step part is formed on an inner-diameter portion of the stair-shaped magnetic pole and at an almost identical position to a step part of the stair shape, and a permanent magnet is fitted to the extreme tip side inner surface of the step part formed on the inner diameter portion of the magnetic pole.

* * * * *